(12) United States Patent
Palaniappan et al.

(10) Patent No.: US 11,880,649 B1
(45) Date of Patent: Jan. 23, 2024

(54) SELECTING A TEMPLATE FOR TRANSFORMING SOURCE DATA USING A COGNITIVE ENGINE

(71) Applicant: Bank of America Corporation, Charlotte, NC (US)

(72) Inventors: Lakshmanan Palaniappan, Chennai (IN); Geeta Bora, Hyderabad (IN); Sudhakar Balu, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/184,455

(22) Filed: Mar. 15, 2023

(51) Int. Cl.
    *H04L 29/06*    (2006.01)
    *G06F 40/186*   (2020.01)

(52) U.S. Cl.
    CPC ................. *G06F 40/186* (2020.01)

(58) Field of Classification Search
    CPC .................................................. G06F 40/186
    See application file for complete search history.

(56) References Cited

U.S. PATENT DOCUMENTS

| | | | |
|---|---|---|---|
| 5,371,842 A * | 12/1994 | Easton | G01R 13/0227 345/442 |
| 7,725,530 B2 | 5/2010 | Sah et al. | |
| 9,135,234 B1 | 9/2015 | Mattos et al. | |
| 9,189,125 B2 | 11/2015 | Taylor et al. | |
| 9,529,780 B2 | 12/2016 | Priyadarshan et al. | |
| 9,686,374 B2 | 6/2017 | Rajkumar et al. | |
| 9,880,709 B2 | 1/2018 | Genoni et al. | |
| 9,916,293 B2 | 3/2018 | Sah et al. | |
| 9,990,102 B2 | 6/2018 | Hunt et al. | |
| 10,067,930 B2 | 9/2018 | Ying et al. | |
| 10,176,170 B2 | 1/2019 | Allen | |
| 10,210,142 B1 | 2/2019 | Jain et al. | |
| 10,284,666 B1 | 5/2019 | Weald et al. | |
| 10,534,842 B2 | 1/2020 | Cho et al. | |
| 10,810,365 B2 | 10/2020 | Myers et al. | |
| 10,817,663 B2 | 10/2020 | Weald et al. | |
| 11,334,644 B2 | 5/2022 | Jerdonek | |
| 11,354,682 B2 | 6/2022 | Jha et al. | |
| 11,514,229 B2 | 11/2022 | Dykema | |
| 11,520,461 B2 | 12/2022 | Wald et al. | |

(Continued)

FOREIGN PATENT DOCUMENTS

| | | | | |
|---|---|---|---|---|
| WO | WO-2012080791 A1 * | 6/2012 | ........... | G01S 5/0009 |
| WO | WO-2017097319 A1 * | 6/2017 | | |

*Primary Examiner* — Hassan Mrabi

(57) ABSTRACT

A processor receives a request to communicate a source data using a preferred communication channel and obtains a first set of communication templates that correspond to a type of the source data and the preferred communication channel. The processor obtains a performance indicator associated with each communication template from the first set of communication template and selects from the first set of communication templates, a communication template associated with the highest value of the performance indicator. The processor transforms the source data using the selected communication template by formatting the source data based at least on one or more multimedia components associated with the selected communication template and transmits the transformed source data using the preferred communication channel.

20 Claims, 4 Drawing Sheets

(56) References Cited

U.S. PATENT DOCUMENTS

| | | |
|---|---|---|
| 2007/0136201 A1 | 6/2007 | Sah et al. |
| 2007/0234201 A1 | 10/2007 | Fukura et al. |
| 2008/0021981 A1 | 1/2008 | Kumar et al. |
| 2010/0287188 A1 | 11/2010 | Kakar |
| 2016/0241668 A1 | 8/2016 | Rajkumar et al. |
| 2018/0220102 A1 | 8/2018 | Pino et al. |
| 2020/0128106 A1* | 4/2020 | McCormack ........... A63F 13/55 |
| 2020/0336396 A1* | 10/2020 | Su ........................ H04L 43/065 |

* cited by examiner

SELECTING A TEMPLATE FOR TRANSFORMING SOURCE DATA USING A COGNITIVE ENGINE

TECHNICAL FIELD

The present disclosure relates generally to data processing, and more specifically to selecting a template for transforming source data using a cognitive engine.

BACKGROUND

Often a user receives several types of communications on a computing node of the user. For example, a user may have several mobile applications installed on a smartphone, wherein each mobile application is configured to receive and present data/information to the user. For example, a user's smartphone typically has several email applications (e.g., official email, personal email etc.), several messaging applications, and several social media applications. Further, each of these applications may be configured to display/announce a notification upon receiving a new message, data or information. Often most of the messages/data received and presented by these mobile applications are irrelevant, not important and/or unwanted (e.g., spam messages) for the user. Thus, there is typically a high likelihood that the user does not consume a data/message received by an application in its entirety. Most often, the user opens a message/document and closes out of the message/document after a quick glance at the first/opening page of the message/document, without scrolling through to the end of the message/document. Even when the user scrolls through at least a portion of the message/document, the user typically does not click on links and/or multimedia content that may be embedded in the message/document. Thus, it is generally challenging for a communication to grab a user's attention and motivate the user to consume the entire content of the communication. This often results in the user missing useful and sometimes critical information.

SUMMARY

The system and method implemented by the system as disclosed in the present disclosure provide technical solutions to the technical problems discussed above by providing intelligent transformation of source data that improves readability of the transformed source data by end users.

For example, the disclosed system and methods provide the practical application of determining a best communication template given a data type associated with a source data and a communication channel to be used to communicate the source data, and then transforming the source data using the determined communication template. As described in embodiments of the present disclosure, a transform manager stores a template archive including a plurality of communication templates, wherein each communication template is designed to be used to transform source data of a particular data type for communication using a particular communication channel. The transform manager is configured monitor usage parameters associated with the communication templates and determine an overall performance indicator for each communication template in the template archive, wherein the overall performance indicator is indicative of an effectiveness of a communication in communicating the content of a source data transformed using the communication template. A higher overall performance indicator corresponds to a higher effectiveness in communicating the source data to users. In one embodiment, the transform manager determines a set of communication templates from the template archive that are associated with the data type and preferred communication channel specified for a source data, and then selects a communication template from the set that is associated with the highest overall performance indicator. The transform manager transforms the source data based on the selected communication template and transmits the transformed source data using the preferred communication channel. By determining performance indicators for the communication templates based on past performance (e.g., effectiveness) of the communication templates in relation to communicating source data of a particular data type transmitted using a particular communication channel and by transforming source data based on a communication template associated with a high performance indicator, the disclosed system and method improve effectiveness of communications as the source data in the communications is transformed using a communication template having a track record of effectively communicating the desired content.

Further by increasing the effectiveness of the communications, the disclosed system and methods increase the likelihood of an intended end user reviewing the content included in a communication the first time the user receives the communication. This avoids transmitting the same communication on multiple occasions in the event that the first communication fails to effectively communicate the desired content. By avoiding multiple transmissions of the same content, the disclosed system and method save processing, memory and network resources.

Thus, the disclosed system and method generally improve the technology associated with communicating content/data to users.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
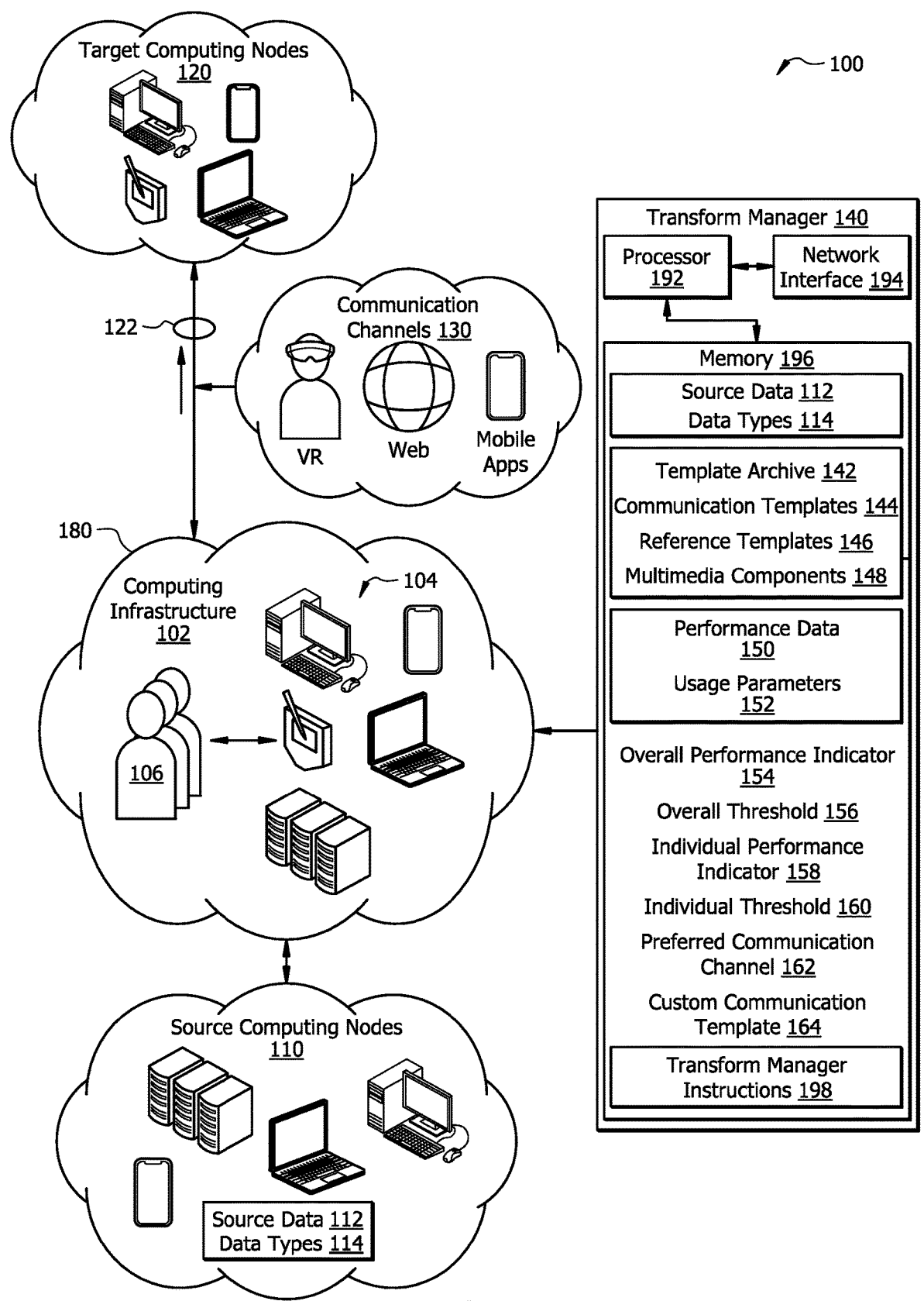
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 180. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, and memory devices all connected to the network 180. Software components may include software applications that are run by one or more of the computing nodes 104 including, but not limited to, operating systems, user interface applications, third party software, database management software, service management software, metaverse software and other customized software programs implementing particular functionalities. For example, software code relating to one or more software applications may be stored in a memory device and one or more processors may process the software code to implement respective functionalities. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., transform manager 140) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a first portion of the computing nodes 104 of the computing infrastructure 102 may include source computing nodes 110. Further, at least a second portion of the computing nodes 104 may include target computing nodes 120. A source computing node 110 may generate source data 112 that is to be communicated to one or more target computing nodes 120 via one or more communication channels 130. Source data 112 may include any data/content that may be useful to users 106 of the target computing nodes 120 including, but not limited to, news, weather information, technical data, training material, promotional content and other informational content. Target computing nodes 120 may include end-user devices including, but not limited to, desktop computers, laptop computers, tablet computers, smart phones, and Virtual Reality (VR) headsets. Communication channels 130 may include, but are not limited to, websites, desktop applications, mobile applications, emails, and a virtual reality platforms (e.g., metaverse platforms).

Often a user 106 receives several types of communications on a computing node 120 of the user 106. For example, a user 106 may have several mobile applications installed on a smartphone, wherein each mobile application is configured to receive and present data/information to the user 106. For example, a user's smartphone typically has several email applications (e.g., official email, personal email etc.), several messaging applications, and several social media applications. Further, each of these applications may be configured to display/announce a notification upon receiving a new message, data or information. Often most of the messages/data received and presented by these mobile applications are irrelevant, not important and/or unwanted (e.g., spam messages) for the user 106. Thus, there is typically a high likelihood that the user 106 does not consume a data/message received by an application in its entirety. Most often, the user 106 opens a message/document and closes out of the message/document after a quick glance at the first/opening page of the message/document, without scrolling through to the end of the message/document. Even when the user 106 scrolls through at least a portion of the message/document, the user 106 typically does not click on links and/or multimedia content that may be embedded in the message/document. Thus, it is generally challenging for a communication to grab a user's attention and motivate the user to consume the entire content of the communication.

Embodiments of the present disclosure discuss techniques to transform source data 112 for communication on a particular communication channel 130 to improve readability of the transformed source data by the end user 106.

In one or more embodiments, one or more computing nodes 104 of the computing infrastructure 102 may implement a transform manager 140 and respective operations performed by the transform manager 140 described in embodiments of the present disclosure. As described in more detail below, transform manager 140 may be configured to transform source data 112 received from one or more source computing nodes 110 to generate a communication 122 for transmitting to one or more target computing nodes 120 using a communication channel 130. As will be apparent from the following disclosure, the transformation of source data 112 performed by the transform manager 140 may improve readability of the transformed communication 122. Transform manager 140 may receive source data 112 from one or more source computing nodes 110 in the form of emails, data/file transfer using a known data/file transfer protocol, data streaming and/or any other method of data transfer. Additionally or alternatively, transform manager 140 may be configured to obtain (e.g., extract) source data 112 from the world wide web (e.g., websites), social media platforms, databases (e.g., data warehouse), cloud platforms and/or any other known sources of data. A transformed communication 122 transmitted to one or more target computing nodes 120 may include, but is not limited to, an email message, a message/data to be presented by a mobile application, a message/data for presenting on a VR platform, a text document in a known format, a spreadsheet, slides, a web page and a multimedia file (e.g., audio and/or video file).

The transform manager 140 comprises a processor 192, a memory 196, and a network interface 194. The transform manager 140 may be configured as shown in FIG. 1 or in any other suitable configuration.

The processor 192 comprises one or more processors operably coupled to the memory 196. The processor 192 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 192 may be a programmable logic device, a microcontroller, a microprocessor, or any suitable combination of the preceding. The processor 192 is communicatively coupled to and in signal communication with the memory 196. The one or more processors are configured to process data and may be implemented in hardware or software. For example, the processor 192 may be 8-bit, 16-bit, 32-bit, 64-bit or of any other suitable architecture. The processor 192 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., transform manager instructions 198) to implement the transform manager 140. In this way, processor 192 may be a special-purpose computer designed to implement the functions disclosed herein. In one or more embodiments, the transform manager 140 is implemented using logic units, FPGAs, ASICs, DSPs, or any other suitable hardware. The transform manager 140 is configured to operate as described with reference to FIGS. 2-4. For example, the processor 192 may be configured to perform at least a portion of the methods 200, 300, and 400 as described in FIGS. 2-4 respectively.

The memory 196 comprises one or more disks, tape drives, or solid-state drives, and may be used as an over-flow data storage device, to store programs when such programs are selected for execution, and to store instructions and data that are read during program execution. The memory 196 may be volatile or non-volatile and may comprise a read-only memory (ROM), random-access memory (RAM), ternary content-addressable memory (TCAM), dynamic random-access memory (DRAM), and static random-access memory (SRAM).

The memory 196 is operable to store source data 112, data types 14, template archive 142 including communication templates 144, reference templates 146, multimedia components 148, performance data 150, usage parameters 152, overall performance indicator 154, overall threshold 156, individual performance indicator 158, individual threshold 160, preferred communication channel 162, custom communication template 164 and the transform manager instructions 198. The transform manager instructions 198 may include any suitable set of instructions, logic, rules, or code operable to execute the transform manager 140.

The network interface 194 is configured to enable wired and/or wireless communications. The network interface 194 is configured to communicate data between the transform manager 140 and other devices, systems, or domains (e.g. computing nodes 104, source computing nodes 110 and target computing nodes 120. For example, the network interface 194 may comprise a Wi-Fi interface, a LAN interface, a WAN interface, a modem, a switch, or a router. The processor 192 is configured to send and receive data using the network interface 194. The network interface 194 may be configured to use any suitable type of communication protocol as would be appreciated by one of ordinary skill in the art.

It may be noted that each of the computing nodes 104, source computing nodes 110 and target computing nodes 120 may be implemented like the transform manager 140 shown in FIG. 1. For example, each of the computing nodes 104, source computing nodes 110 and target computing nodes 120 may have a respective processor and a memory that stores data and instructions to perform operations discussed above.

Transform manager 140 may be configured to store a template archive 142 including a plurality of communication templates 144. Each communication template 144 is designed to transform source data 112 corresponding to one or more data types 114. A communication template 144 may include one or more multimedia components 148 that may be used to transform portions of a source data 112. Multimedia components 148 that may be part of a communication template 144 may include, but are not limited to, one or more of an audio clip, a video clip, a carousel, a spread sheet, a table, a chart and a film strip. In one embodiment, a communication template 144 may include software tools to generate multimedia content corresponding to each multimedia component 148 included in the communication template 144. For example, a particular communication template 144 may include template spreadsheets and other charting tools to present employee data received from an employee database.

Additionally or alternatively, a communication template 144 may be designed for communicating source data 112 using one or more particular communication channels 130. For example, a communication template 144 may be designed to communicate source data 112 on mobile applications such that text and multimedia content generated using the communication template 144 is compatible for presenting using a mobile application on a mobile device such as a smart phone.

Transform manager 140 may be configured to store in the template archive 142 each communication template 144 mapped to one or more of at least one data type 114 the communication template 144 is designed to transform and at least one communication channel 130 the communication template 144 is designed to be used for.

Transform manager 140 may be configured to transform source data 112 received from one or more source computing nodes 110 in accordance with one or more communication templates 144. Transforming source data 112 may include formatting contents of the source data in accordance with a communication template 144 which may include generating text, multimedia content, charts, graphs, spreadsheets, hyperlinks etc. according to tools included in the communication template 144 to generate the respective text, multimedia content, charts, graphs, spreadsheets, hyperlinks etc. For example, transform manager 140 may receive source data 112 from a university server including educational content. Transform manager 140 may be configured to select from the template archive 142 a communication template 144 that is designed to present educational content and that includes sub-templates/tools for inserting hyperlinks, text, videos, audios, spreadsheets, charts etc. Transform manager 140 may be configured to generate a communication 122 by transforming the source data 112 by generating one or more of hyperlinks, text, videos, audios, spreadsheets, charts etc. based on the source data 112. Transform manager 140 may be configured to transmit the generated communication 122 using a preferred communication channel 162. In one embodiment, the preferred communication channel 162 may be specified by a source computing node 110 that transmitted the source data 112.

Transform manager 140 may be configured to determine at least one of an overall performance indicator 154 and an individual performance indicator 158 for each communication template 144 in the template archive 142. An overall performance indicator 154 associated with a communication template 144 is indicative of an effectiveness of the communication template 144 in communicating source data 112 of one or more data types 114. In an additional or alternative embodiment, an overall performance indicator 154 associated with a communication template 144 is indicative of an effectiveness of the communication template 144 in communicating source data 112 of one or more data types 114 using a particular communication channel 130. An individual performance indicator 158 is associated with a particular multimedia component 148 included in a particular communication template 144. An individual performance indicator 158 associated with a multimedia component 148 included in a communication template 144 is indicative of an effectiveness of the multimedia component in communicating source data 112 of one or more data types 114. In an additional or alternative embodiment, an individual performance indicator 158 associated with a multimedia component 148 included in a communication template 144 is indicative of an effectiveness of the multimedia component in communicating source data 112 of one or more data types 114 using a particular communication channel 130.

Transform manager 140 may be configured to determine an overall performance indicator 154 for a particular communication template 144 based on performance data 150 associated with the particular communication template 144. Performance data 150 associated with a communication template 144 indicates a performance of the communication template 144 in relation to a plurality of usage parameters 152 associated with the communication template 144. In this context, transform manager 140 may be configured to monitor and record (e.g., store) a plurality of usage parameter 152 associated with a communication template 144. Usage parameters 152 associated with a communication template 144 may include, but are not limited to, an average number of times communications 122 generated based on the communication template 144 were accessed by users 106, an average number of times the communications 122 were reviewed by the users 106 from a start to an end of the communications 122, an average number of times multimedia components 148 included in the communications 122 were used/reviewed by the users 106, and an average number of times the communications 122 were accessed using a particular communication channel 130 associated with the communication template 144.

Transform manager 140 may be configured assign a numerical value to the overall performance indicator 154 associated with a communication template 144 based on the performance data 150 associated with the communication template 144. For example, transform manager 140 assigns a higher numerical value to the overall performance indicator 154 associated with the communication template 144 when one or more of the usage parameters 152 are associated with a higher average number.

In additional or alternative embodiment, transform manager 140 may be configured to determine an individual performance indicator 158 for a particular multimedia component 148 associated with a particular communication template 144 based on performance data 150 associated with the multimedia component 148. Performance data 150 associated with the multimedia component 148 indicates a performance of the multimedia component 148 in relation to one or more usage parameters 152 associated with the multimedia component 148. An example usage parameter 152 associated with a multimedia component 148 associated with a communication template 144 includes an average number of times the multimedia component 148 was used by users 106 in communications 122 generated using the communication template 144.

Transform manager 140 may be configured to assign a numerical value to the individual performance indicator 158 associated with a multimedia component 148 based on the performance data 150 associated with the multimedia component 148. For example, transform manager 140 assigns a higher numerical value to the individual performance indicator 158 associated with the multimedia component 148 when the usage parameter 152 has a higher average number.

Transform manager 140 may be configured to monitor the usage parameters 152 associated with a communication template 144 as communications 122 generated based on the communication template 144 are used by users 106. Transform manager 140 may update the overall performance indicator 154 and the individual performance indicator 158 more data in relation to the usage parameters 152 is collected, and store the updated overall performance indicator 154 and the updated individual performance indicator 158 in the template archive 142 mapped to the communication template 144.

Selecting a Communication Template from the Template Archive

Transform manager 140 may be configured to select from the template archive 142 a communication template 144 for transforming source data 112 received from one or more source computing nodes 110. Transform manager 140 may be configured to select an appropriate communication template 144 from the template archive 142 based on one or more of overall performance indicators 154 and individual performance indicators 158 associated with the communication templates 144 stored in the template archive 142.

Transform manager 140 may be configured to receive a request to communicate a source data 112 using a preferred communication channel 162. Transform manager 140 may receive the source data 112 from one or more source computing nodes 110. Upon receiving the source data 112, transform manager 140 determines a data type 114 associated with the source data 112. For example, transform manager 140 may analyze the data contents in the received source data 112 and determine a data type associated with the source data 112. In one embodiment, the data type 114 associated with the received source data 112 may be included (e.g., as metadata) in the request received from the source computing node 110 transmitting the request. In an additional or alternative embodiment, the request for communication received from the source computing node 110 may include the preferred communication channel 130 that is to be used to transmit a communication 122 generated for the source data 112.

Once the data type 114 associated with the source data 112 and the preferred communication channel 162 is determined, transform manager 140 may be configured to determine a set of communication templates from the template archive 142 that correspond to the data type 114 associated with the source data 112 and the preferred communication channel 162. In other words, transform manager 140 determines a set of communication templates 144, wherein each communication template 144 from the set is designed to transform source data 112 of a data type 114 that is the same as the determined data type 114 of the received source data 112, and is designed for communication using the preferred communication channel 162 associated with the request. To determine the set of communication templates 144, transform manager 140 may search the communication templates 144 stored in the template archive 142 based on the combination of the data type 114 and preferred communication channel 162 associated with the received request for communication. As described above, each communication channel 130 in the template archive 142 may be mapped to one or more data types 114 and one or more communication channels 130. Transform manager 140 selects those communication templates 144 from the template archive 142 that are mapped to the data type 114 of the received source data 112 and the preferred communication channel 162.

After determining the set of communication templates 144 that match the data type 114 and preferred communication channel 162 associated with the request, transform manager 140 may be configured to obtain an overall performance indicator 154 associated with each communication template 144 from the determined set of communication templates 144. As described above, an overall performance indicator 154 associated with a communication template 144 is indicative of an effectiveness of the communication template 144 in communicating a source data 112. The transform manager 140 obtains from the template archive 142 the overall performance indicator 154 mapped to each communication template 144 in the determined set of communication templates 144.

Transform manager 140 may be configured to select from the set of communication templates 144 a particular communication template 144 that is associated with the highest overall performance indicator 154 (e.g., highest numerical value) among the overall performance indicators 154 associated with the communication templates in the determined set.

Transform manager 140 may be configured to transform the received source data 112 using the selected communication template 144. Transforming the source data 112 may include formatting the source data 112 based at least in part upon one or more multimedia components 148 associated with the selected communication template 144. Based on the transformed source data, transform manager 140 may generate a communication 122 (e.g., email, webpage etc.) depending on the preferred communication channel 162, and transmit the communication 122 using the preferred communication channel 162.

In one embodiment, transform manager 140 may be configured to receive source data 112 from a plurality of source computing nodes 110 for transmitting to one or more target computing nodes 120 as a single communication 122. In this case, the transform manager 140 may be configured to aggregate source data received from several source computing nodes 110 and generate a single communication 122 based on a communication template 144 selected from the template archive 142. The single communication is then transmitted to one or more target computing nodes 120.

In one embodiment, transform manager 140 may be configured to employ a cognitive engine using a machine learning model to search the template archive 142 and select a most appropriate communication template 144 for transforming the source data 112. For example, the cognitive engine may be trained using the template archive 142 to determine the set of communication templates 144 by comparing data type 114 of the received source data 112 and the preferred communication channel 162 with the respective data types 114 and communication channels 130 mapped to each communication template 144 in the template archive 142. Further, the cognitive engine may be trained to analyze the overall performance indicators associated with each communication template 144 in the determined set of communication templates 144 to determine a communication template 144 associated with the highest overall performance indicator.

Generating a Custom Communication Template

In one or more embodiments, transform manager 140 may be configured to generate a custom communication template 164 to transform source data 112 received from one or more source computing nodes 110 by selecting highly effective multimedia components 148 (e.g., having high numerical values of individual performance indicators 158) from one or more communication templates 144 stored in the template archive 142.

Transform manager 140 may be configured to receive a request to communicate a source data 112 using a preferred communication channel 162. Transform manager 140 may receive the source data 112 from one or more source computing nodes 110. Upon receiving the source data 112, transform manager 140 determines a data type 114 associated with the source data 112. For example, transform manager 140 may analyze the data contents in the received source data 112 and determine a data type 114 associated with the source data 112. In one embodiment, the data type 114 associated with the received source data 112 may be included (e.g., as metadata) in the request received from the source computing node 110 transmitting the request. In an additional or alternative embodiment, the request for communication received from the source computing node 110 may include the preferred communication channel 130 that is to be used to transmit a communication 122 generated for the source data 112.

Once the data type 114 associated with the source data 112 and the preferred communication channel 162 is determined, transform manager 140 may be configured to determine a set of communication templates from the template archive 142 that corresponds to the data type 114 associated with the source data 112 and the preferred communication channel 162. In other words, transform manager 140 determines a set of communication templates 144, wherein each communication template 144 from the set is designed to transform source data 112 of a data type 114 that is the same as the determined data type 114 of the received source data 112, and is designed for communication using the preferred communication channel 162 associated with the request. To determine the set of communication templates 144, transform manager 140 may search the communication templates 144 stored in the template archive 142 based on the combination of the data type 114 and preferred communication channel 162 associated with the received request for communication. As described above, each communication channel 130 in the template archive 142 may be mapped to one or more data types 114 and one or more communication channels 130. Transform manager 140 selects those communication templates 144 from the template archive 142 that are mapped to the data type 114 of the received source data 112 and the preferred communication channel 162.

After determining the set of communication templates 144 that match the data type 114 and preferred communication channel 162 associated with the request, transform manager 140 may be configured to obtain an overall performance indicator 154 associated with each communication template 144 from the determined set of communication templates 144. As described above, an overall performance indicator 154 associated with a communication template 144 is indicative of an effectiveness of the communication template 144 in communicating a source data 112. The transform manager 140 obtains from the template archive 142 the overall performance indicator 154 mapped to each communication template 144 in the determined set of communication templates 144.

Transform manager 140 may be configured to select from the set of communication templates 144 one or more communication templates 144 that are associated with high overall performance indicators 154 (e.g., high numerical values) among the overall performance indicators 154 associated with the communication templates in the determined set. For example, transform manager 140 selects from the determined set of communication templates 144, one or more communication templates 144 that are associated with respective values of the overall performance indicator 154 that equal or exceed an overall threshold 156. The overall threshold 156 may include a pre-selected numerical value of the overall performance indicator 154. In one embodiment, the transform manager 140 selects from the determined set of communication templates 144, all communication templates 144 that are associated with respective values of the overall performance indicator 154 that equal or exceed the overall threshold 156.

After determining one or more communication templates 144 from the template archive 142 that equal or exceed the overall threshold 156, transform manager 140 may be configured to obtain an individual performance indicator 158 associated with each multimedia component 148 included in the selected one or more communication templates 144. As described above, an individual performance indicator 158 associated with a multimedia component 148 is indicative of an effectiveness of the multimedia component 148 in communicating source data 112.

Transform manager 140 may be configured to generate a custom communication template 164 by plugging in highly effective multimedia components 148 from the selected one or more communication templates 144 into a reference template 146. For example, transform manager 140 may analyze the individual performance indicators 158 associated with multimedia components 148 from the selected one or more communication templates 144 and determine those multimedia components 148 that are associated with an individual performance indicator 158 that equals or exceeds an individual threshold 160. In one embodiment, the individual threshold 160 includes a pre-selected numerical value of the individual performance indicator 158. To generate a custom communication template 164, transform manager 140 may be configured to add to a reference template 146 one or more of the determined multimedia components 148 associated with an individual performance indicator 158 that equals or exceeds an individual threshold 160. In one embodiment, the reference template 146 may be a communication template 144 from the determined set of communication templates 144 that is associated with the highest numerical value of the overall performance indicator 154 among the overall performance indicators 154 associated with the communication templates 144 in the set. In an alternative embodiment, the reference template 146 is a blank communication template in which multimedia components 148 may be added as needed to generate a custom communication template 164.

In one example, transform manager 140 determines from the set of communication templates 144, a first communication template 144 and a second communication template 144, wherein the respective overall performance indicators 154 of the first and second communication templates 144 equal or exceed the overall threshold 156. Transform manager 140 determines from the first communication template 144, a first multimedia component 148 having an associated first individual performance indicator 158 that equals or exceeds the individual threshold 160. Transform manager 140 determines from the second communication template 144, a second multimedia component 148 having an associated second individual performance indicator 158 that equals or exceeds the individual threshold 160. Transform manager 140 generates a custom communication template 164 by adding the first multimedia component 148 and the second multimedia component 148 component to a reference communication template 146.

Transform manager 140 may be configured to transform the received source data 112 using the custom communication template 164. Transforming the source data 112 may include formatting the source data 112 based at least in part upon one or more multimedia components 148 associated with the generated custom communication template 164. Following the above example, transforming the source data 112 may include transforming a first portion of the source data 112 using the selected first multimedia component 148, transforming a second portion of the source data 112 using the second multimedia component 148. In one embodiment, the reference template 146 may include one or more standard multimedia components 148 that are generally used across communication templates 146. After transforming the first and second portions of the source data 112 using the first and second multimedia components 148, transform manager 140 may be configured to transform a remaining portion of the source data 112 using the standard multimedia components 148 of the reference template 146.

Based on the transformed source data, transform manager 140 may generate a communication 122 (e.g., email, webpage etc.) depending on the preferred communication channel 162, and transmit the communication 122 using the preferred communication channel 162.

In one or more embodiments, transform manager 140 may be configured to intelligently determine whether to select an existing communication template 144 from the template archive 142 or generate a custom communication template 164 to transform the received source data 112, such that a communication 122 including the transformed source data 112 is highly effective in communicating the content of the source data 112.

In one or more embodiments, after determining the set of communication templates 144 that match the data type 114 and preferred communication channel 162 associated with the request, transform manager 140 may determine that no communication template 144 from the determined set is associated with a value (e.g., numerical value) of the overall performance indicator 154 that equals or exceeds the overall threshold 156. In response to this determination, transform manager 140 may be configured to select from the determined set of communication templates 144 one or more communication templates 144 having a respective one or more highest values of the overall performance indicator 154 among the overall performance indicators 154 associated with the communication templates 144 in the determined set.

After selecting one or more communication templates 144 having a respective one or more highest values of the overall performance indicator 154, transform manager 140 may be configured to obtain an individual performance indicator 158 associated with each multimedia component 148 included in the selected one or more communication templates 144, and generate a custom communication template 164 by plugging in highly effective multimedia components 148 from the selected one or more communication templates 144 into a reference template 146, as described above.

Transform manager 140 transforms the source data 112 based on the generated custom communication template 164 as described above.

In an alternative or additional embodiment, when the transform manager 140 determines that one or more communication templates 144 from the determined set of communication templates 144 are associated with overall performance indicators 154 that equal or exceed the overall threshold 156, transform manager 140 selects one of the communication templates 144 from the set whose overall performance indicator 154 equals or exceeds the overall threshold 156 and transforms the source data 112 based on the selected communication template 144.

Figure 2:
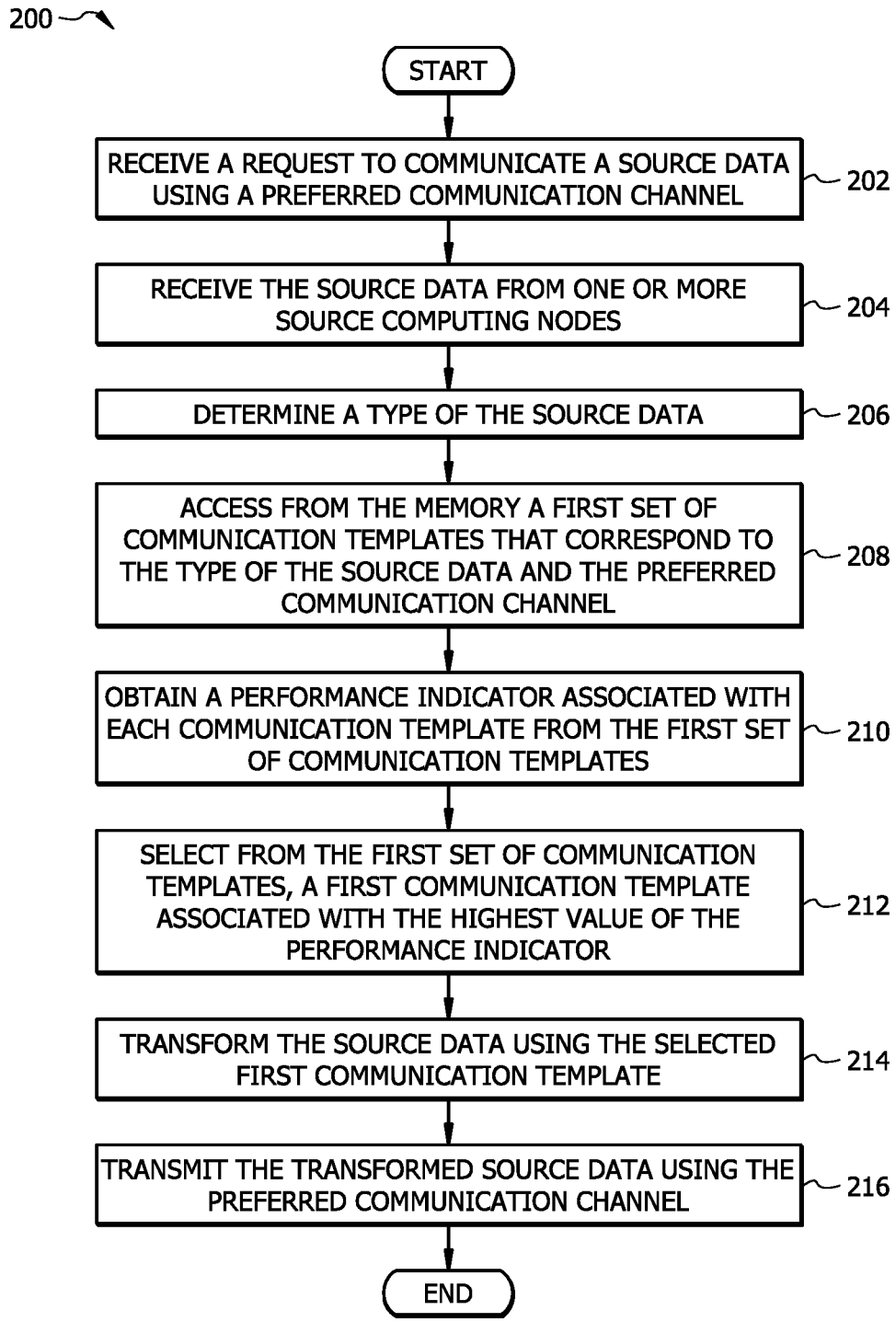
FIG. 2 illustrates a flowchart of an example method for determining a communication template for transforming source data, in accordance with one or more embodiments of the present disclosure.

FIG. 2 illustrates a flowchart of an example method 200 for determining a communication template 144 for transforming source data 112, in accordance with one or more embodiments of the present disclosure. Method 200 may be performed by the transform manager 140 shown in FIG. 1.

At operation 202, transform manager 140 receives a request to communicate a source data 112 using a preferred communication channel 162.

At operation 204, transform manager 140 receives the source data 112 from one or more source computing nodes 110.

At operation 206, transform manager 140 determines a data type 114 of the source data 112.

As described above, transform manager 140 may be configured to receive a request to communicate a source data 112 using a preferred communication channel 162. Transform manager 140 may receive the source data 112 from one or more source computing nodes 110. Upon receiving the source data 112, transform manager 140 determines a data type 114 associated with the source data 112. For example, transform manager 140 may analyze the data contents in the received source data 112 and determine a data type associated with the source data 112. In one embodiment, the data type 114 associated with the received source data 112 may be included (e.g., as metadata) in the request received from the source computing node 110 transmitting the request. In an additional or alternative embodiment, the request for communication received from the source computing node 110 may include the preferred communication channel 130 that is to be used to transmit a communication 122 generated for the source data 112.

At operation 208, transform manager 140 accesses from the memory (e.g., memory 196 shown in FIG. 1) a first set of communication templates 144 that correspond to the data type 114 of the source data 112 and the preferred communication channel 162.

As described above, transform manager 140 may be configured to store a template archive 142 including a plurality of communication templates 144. Each communication template 144 is designed to transform source data 112 corresponding to one or more data types 114. A communication template 144 may include one or more multimedia components 148 that may be used to transform portions of a source data 112. Multimedia components 148 that may be part of a communication template 144 may include, but are not limited to, one or more of an audio clip, a video clip, a carousel, a spread sheet, a table, a chart and a film strip. In one embodiment, a communication template 144 may include software tools to generate multimedia content corresponding to each multimedia component 148 included in the communication template 144. For example, a particular communication template 144 may include template spreadsheets and other charting tools to present employee data received from an employee database.

Additionally or alternatively, a communication template 144 may be designed for communicating source data 112 using one or more particular communication channels 130. For example, a communication template 144 may be designed to communicate source data 112 on mobile applications such that text and multimedia content generated using the communication template 144 is compatible for presenting using a mobile application on a mobile device such as a smart phone.

Transform manager 140 may be configured to store in the template archive 142 each communication template 144 mapped to one or more of at least one data type 114 the communication template 144 is designed to transform and at least one communication channel 130 the communication template 144 is designed to be used for.

Once the data type 114 associated with the source data 112 and the preferred communication channel 162 is determined (e.g., at operation 206), transform manager 140 may be configured to determine a set of communication templates from the template archive 142 that correspond to the data type 114 associated with the source data 112 and the preferred communication channel 162. In other words, transform manager 140 determines a set of communication templates 144, wherein each communication template 144 from the set is designed to transform source data 112 of a data type 114 that is the same as the determined data type 114 of the received source data 112, and is designed for communication using the preferred communication channel 162 associated with the request. To determine the set of communication templates 144, transform manager 140 may search the communication templates 144 stored in the template archive 142 based on the combination of the data type 114 and preferred communication channel 162 associated with the received request for communication. As described above, each communication channel 130 in the template archive 142 may be mapped to one or more data types 114 and one or more communication channels 130. Transform manager 140 selects those communication templates 144 from the template archive 142 that are mapped to the data type 114 of the received source data 112 and the preferred communication channel 162.

At operation 210, transform manager 140 obtains an overall performance indicator 154 associated with each communication template 144 from the first set of communication templates 144.

As described above, transform manager 140 may be configured to determine at least one of an overall performance indicator 154 and an individual performance indicator 158 for each communication template 144 in the template archive 142. An overall performance indicator 154 associated with a communication template 144 is indicative of an effectiveness of the communication template 144 in communicating source data 112 of one or more data types 114. In an additional or alternative embodiment, an overall performance indicator 154 associated with a communication template 144 is indicative of an effectiveness of the communication template 144 in communicating source data 112 of one or more data types 114 using a particular communication channel 130. An individual performance indicator 158 is associated with a particular multimedia component 148 included in a particular communication template 144. An individual performance indicator 158 associated with a multimedia component 148 included in a communication template 144 is indicative of an effectiveness of the multimedia component in communicating source data 112 of one or more data types 114. In an additional or alternative embodiment, an individual performance indicator 158 associated with a multimedia component 148 included in a communication template 144 is indicative of an effectiveness of the multimedia component in communicating source data 112 of one or more data types 114 using a particular communication channel 130.

Transform manager 140 may be configured to determine an overall performance indicator 154 for a particular communication template 144 based on performance data 150 associated with the particular communication template 144. Performance data 150 associated with a communication template 144 indicates a performance of the communication template 144 in relation to a plurality of usage parameters 152 associated with the communication template 144. In this context, transform manager 140 may be configured to monitor and record (e.g., store) a plurality of usage parameter 152 associated with a communication template 144. Usage parameters 152 associated with a communication template 144 may include, but are not limited to, an average number of times communications 122 generated based on the communication template 144 were accessed by users 106, an average number of times the communications 122 were reviewed by the users 106 from a start to an end of the communications 122, an average number of times multimedia components 148 included in the communications 122 were used/reviewed by the users 106, and an average number of times the communications 122 were accessed using a particular communication channel 130 associated with the communication template 144.

Transform manager 140 may be configured assign a numerical value to the overall performance indicator 154 associated with a communication template 144 based on the performance data 150 associated with the communication template 144. For example, transform manager 140 assigns a higher numerical value to the overall performance indicator 154 associated with the communication template 144 when one or more of the usage parameters 152 are associated with a higher average number.

After determining the set of communication templates 144 that match the data type 114 and preferred communication channel 162 associated with the request, transform manager 140 may be configured to obtain an overall performance indicator 154 associated with each communication template 144 from the determined set of communication templates 144. As described above, an overall performance indicator 154 associated with a communication template 144 is indicative of an effectiveness of the communication template 144 in communicating a source data 112. The transform manager 140 obtains from the template archive 142 the overall performance indicator 154 mapped to each communication template 144 in the determined set of communication templates 144.

At operation 212, transform manager 140 selects from the first set of communication templates 144, a first communication template 144 associated with the highest value of the overall performance indicator 154. As described above, transform manager 140 may be configured to select from the set of communication templates 144 a particular communication template 144 that is associated with the highest overall performance indicator 154 (e.g., highest numerical value) among the overall performance indicators 154 associated with the communication templates in the determined set.

At operation 214, transform manager 140 transforms the source data 112 using the selected first communication template 144 by formatting the source data 112 based at least in part upon one or more multimedia components 148 associated with the selected first communication template 144.

As described above, transform manager 140 may be configured to transform the received source data 112 using the selected communication template 144. Transforming the source data 112 may include formatting the source data 112 based at least in part upon one or more multimedia components 148 associated with the selected communication template 144.

Transform manager 140 may be configured to transform source data 112 received from one or more source computing nodes 110 in accordance with one or more communication templates 144. Transforming source data 112 may include formatting contents of the source data in accordance with a communication template 144 which may include generating text, multimedia content, charts, graphs, spreadsheets, hyperlinks etc. according to tools included in the communication template 144 to generate the respective text, multimedia content, charts, graphs, spreadsheets, hyperlinks etc. For example, transform manager 140 may receive source data 112 from a university server including educational content. Transform manager 140 may be configured to select from the template archive 142 a communication template 144 that is designed to present educational content and that includes sub-templates/tools for inserting hyperlinks, text, videos, audios, spreadsheets, charts etc. Transform manager 140 may be configured to generate a communication 122 by transforming the source data 112 by generating one or more of hyperlinks, text, videos, audios, spreadsheets, charts etc. based on the source data 112.

At operation 216, transform manager 140 transmits the transformed source data 112 using the preferred communication channel 162. As described above, based on the transformed source data, transform manager 140 may generate a communication 122 (e.g., email, webpage etc.) depending on the preferred communication channel 162, and transmit the communication 122 using the preferred communication channel 162.

Figure 3:
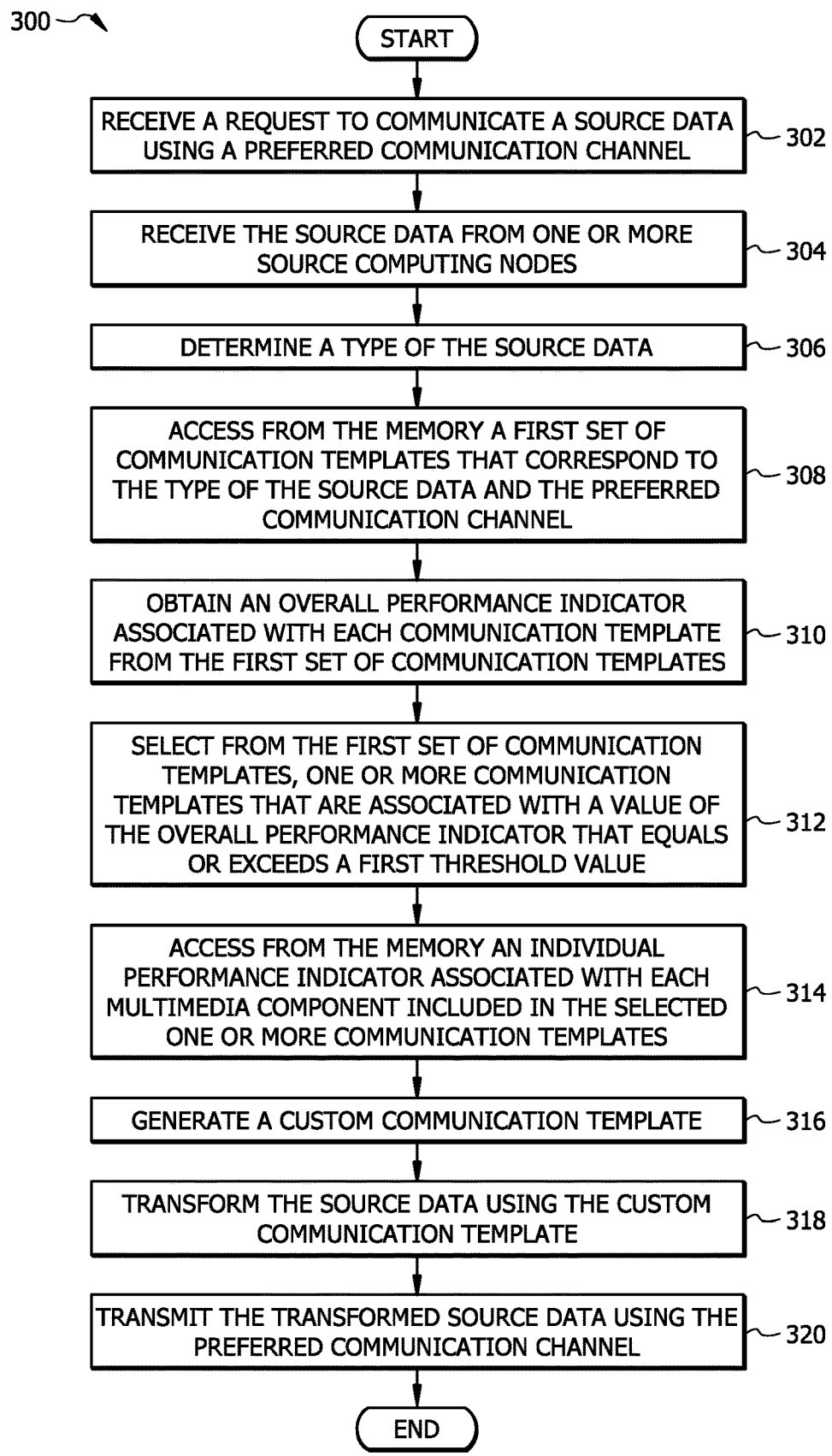
FIG. 3 illustrates a flowchart of an example method for generating a custom communication template for transforming source data, in accordance with one or more embodiments of the present disclosure.

FIG. 3 illustrates a flowchart of an example method 300 for generating a custom communication template 164 for transforming source data 112, in accordance with one or more embodiments of the present disclosure. Method 300 may be performed by the transform manager 140 shown in FIG. 1.

At operation 302, transform manager 140 receives a request to communicate a source data 112 using a preferred communication channel 162.

At operation 304, transform manager 140 receives the source data 112 from one or more source computing nodes 110.

At operation 306, transform manager 140 determines a data type 114 of the source data 112.

As described above, transform manager 140 may be configured to receive a request to communicate a source data 112 using a preferred communication channel 162. Transform manager 140 may receive the source data 112 from one or more source computing nodes 110. Upon receiving the source data 112, transform manager 140 determines a data type 114 associated with the source data 112. For example, transform manager 140 may analyze the data contents in the received source data 112 and determine a data type associated with the source data 112. In one embodiment, the data type 114 associated with the received source data 112 may be included (e.g., as metadata) in the request received from the source computing node 110 transmitting the request. In an additional or alternative embodiment, the request for communication received from the source computing node 110 may include the preferred communication channel 130 that is to be used to transmit a communication 122 generated for the source data 112.

At operation 308, transform manager 140 accesses from the memory (e.g., memory 196 shown in FIG. 1) a first set of communication templates 144 that correspond to the data type 114 of the source data 112 and the preferred communication channel 162.

As described above, transform manager 140 may be configured to store a template archive 142 including a plurality of communication templates 144. Each communication template 144 is designed to transform source data 112 corresponding to one or more data types 114. A communication template 144 may include one or more multimedia components 148 that may be used to transform portions of a source data 112. Multimedia components 148 that may be part of a communication template 144 may include, but are not limited to, one or more of an audio clip, a video clip, a carousel, a spread sheet, a table, a chart and a film strip. In one embodiment, a communication template 144 may include software tools to generate multimedia content corresponding to each multimedia component 148 included in the communication template 144. For example, a particular communication template 144 may include template spreadsheets and other charting tools to present employee data received from an employee database.

Additionally or alternatively, a communication template 144 may be designed for communicating source data 112 using one or more particular communication channels 130. For example, a communication template 144 may be designed to communicate source data 112 on mobile applications such that text and multimedia content generated using the communication template 144 is compatible for presenting using a mobile application on a mobile device such as a smart phone.

Transform manager 140 may be configured to store in the template archive 142 each communication template 144 mapped to one or more of at least one data type 114 the communication template 144 is designed to transform and at least one communication channel 130 the communication template 144 is designed to be used for.

Once the data type 114 associated with the source data 112 and the preferred communication channel 162 is determined (e.g., at operation 206), transform manager 140 may be configured to determine a set of communication templates from the template archive 142 that correspond to the data type 114 associated with the source data 112 and the preferred communication channel 162. In other words, transform manager 140 determines a set of communication templates 144, wherein each communication template 144 from the set is designed to transform source data 112 of a data type 114 that is the same as the determined data type 114 of the received source data 112, and is designed for communication using the preferred communication channel 162 associated with the request. To determine the set of communication templates 144, transform manager 140 may search the communication templates 144 stored in the template archive 142 based on the combination of the data type 114 and preferred communication channel 162 associated with the received request for communication. As described above, each communication channel 130 in the template archive 142 may be mapped to one or more data types 114 and one or more communication channels 130. Transform manager 140 selects those communication templates 144 from the template archive 142 that are mapped to the data type 114 of the received source data 112 and the preferred communication channel 162.

At operation 310, transform manager 140 obtains an overall performance indicator 154 associated with each communication template 144 from the first set of communication templates 144.

As described above, transform manager 140 may be configured to determine at least one of an overall performance indicator 154 and an individual performance indicator 158 for each communication template 144 in the template archive 142. An overall performance indicator 154 associated with a communication template 144 is indicative of an effectiveness of the communication template 144 in communicating source data 112 of one or more data types 114. In an additional or alternative embodiment, an overall performance indicator 154 associated with a communication template 144 is indicative of an effectiveness of the communication template 144 in communicating source data 112 of one or more data types 114 using a particular communication channel 130. An individual performance indicator 158 is associated with a particular multimedia component 148 included in a particular communication template 144. An individual performance indicator 158 associated with a multimedia component 148 included in a communication template 144 is indicative of an effectiveness of the multimedia component in communicating source data 112 of one or more data types 114. In an additional or alternative embodiment, an individual performance indicator 158 associated with a multimedia component 148 included in a communication template 144 is indicative of an effectiveness of the multimedia component in communicating source data 112 of one or more data types 114 using a particular communication channel 130.

Transform manager 140 may be configured to determine an overall performance indicator 154 for a particular communication template 144 based on performance data 150 associated with the particular communication template 144. Performance data 150 associated with a communication template 144 indicates a performance of the communication template 144 in relation to a plurality of usage parameters 152 associated with the communication template 144. In this context, transform manager 140 may be configured to monitor and record (e.g., store) a plurality of usage parameter 152 associated with a communication template 144. Usage parameters 152 associated with a communication template 144 may include, but are not limited to, an average number of times communications 122 generated based on the communication template 144 were accessed by users 106, an average number of times the communications 122 were reviewed by the users 106 from a start to an end of the communications 122, an average number of times multimedia components 148 included in the communications 122 were used/reviewed by the users 106, and an average number of times the communications 122 were accessed using a particular communication channel 130 associated with the communication template 144.

Transform manager 140 may be configured assign a numerical value to the overall performance indicator 154 associated with a communication template 144 based on the performance data 150 associated with the communication template 144. For example, transform manager 140 assigns a higher numerical value to the overall performance indicator 154 associated with the communication template 144 when one or more of the usage parameters 152 are associated with a higher average number.

After determining the set of communication templates 144 that match the data type 114 and preferred communication channel 162 associated with the request, transform manager 140 may be configured to obtain an overall performance indicator 154 associated with each communication template 144 from the determined set of communication templates 144. As described above, an overall performance indicator 154 associated with a communication template 144 is indicative of an effectiveness of the communication template 144 in communicating a source data 112. The transform manager 140 obtains from the template archive 142 the overall performance indicator 154 mapped to each communication template 144 in the determined set of communication templates 144.

At operation 312, transform manager 140 selects from the first set of communication templates 144, one or more communication templates 144 that are associated with a value of the overall performance indicator 154 that equals or exceeds a first threshold value (e.g., overall threshold 156).

As described above, transform manager 140 may be configured to select from the set of communication templates 144 one or more communication templates 144 that are associated with high overall performance indicators 154 (e.g., high numerical values) among the overall performance indicators 154 associated with the communication templates in the determined set. For example, transform manager 140 selects from the determined set of communication templates 144, one or more communication templates 144 that are associated with respective values of the overall performance indicator 154 that equal or exceed an overall threshold 156. The overall threshold 156 may include a pre-selected numerical value of the overall performance indicator 154. In one embodiment, the transform manager 140 selects from the determined set of communication templates 144, all communication templates 144 that are associated with respective values of the overall performance indicator 154 that equal or exceed the overall threshold 156.

At operation 314, transform manager 140 accesses from the memory (e.g., memory 196 shown in FIG. 1) an individual performance indicator 158 associated with each multimedia component 148 included in the selected one or more communication templates 144.

As described above, after determining one or more communication templates 144 from the template archive 142 that are associated with overall performance indicators 154 equaling or exceeding the overall threshold 156, transform manager 140 may be configured to obtain an individual performance indicator 158 associated with each multimedia component 148 included in the selected one or more communication templates 144. As described above, an individual performance indicator 158 associated with a multimedia component 148 is indicative of an effectiveness of the multimedia component 148 in communicating source data 112.

Transform manager 140 may be configured to determine an individual performance indicator 158 for a particular multimedia component 148 associated with a particular communication template 144 based on performance data 150 associated with the multimedia component 148. Performance data 150 associated with the multimedia component 148 indicates a performance of the multimedia component 148 in relation to one or more usage parameters 152 associated with the multimedia component 148. An example usage parameter 152 associated with a multimedia component 148 associated with a communication template 144 includes an average number of times the multimedia component 148 was used by users 106 in communications 122 generated using the communication template 144.

Transform manager 140 may be configured to assign a numerical value to the individual performance indicator 158 associated with a multimedia component 148 based on the performance data 150 associated with the multimedia component 148. For example, transform manager 140 assigns a higher numerical value to the individual performance indicator 158 associated with the multimedia component 148 when the usage parameter 152 has a higher average number.

At operation 316, transform manager 140 generates a custom communication template 164.

As described above, transform manager 140 may be configured to generate a custom communication template 164 by plugging in highly effective multimedia components 148 from the selected one or more communication templates 144 into a reference template 146. For example, transform manager 140 may analyze the individual performance indicators 158 associated with multimedia components 148 from the selected one or more communication templates 144 and determine those multimedia components 148 that are associated with an individual performance indicator 158 that equals or exceeds an individual threshold 160. In one embodiment, the individual threshold 160 includes a pre-selected numerical value of the individual performance indicator 158. To generate a custom communication template 164, transform manager 140 may be configured to add to a reference template 146 one or more of the determined multimedia components 148 associated with an individual performance indicator 158 that equals or exceeds an individual threshold 160. In one embodiment, the reference template 146 may be a communication template 144 from the determined set of communication templates 144 that is associated with the highest numerical value of the overall performance indicator 154 among the overall performance indicators 154 associated with the communication templates 144 in the set. In an alternative embodiment, the reference template 146 is a blank communication template in which multimedia components 148 may be added as needed to generate a custom communication template 164.

In one example, transform manager 140 determines from the set of communication templates 144, a first communication template 144 and a second communication template 144, wherein the respective overall performance indicators 154 of the first and second communication templates 144 equal or exceed the overall threshold 156. Transform manager 140 determines from the first communication template 144, a first multimedia component 148 having an associated first individual performance indicator 158 that equals or exceeds the individual threshold 160. Transform manager 140 determines from the second communication template 144, a second multimedia component 148 having an associated second individual performance indicator 158 that equals or exceeds the individual threshold 160. Transform manager 140 generates a custom communication template 164 by adding the first multimedia component 148 and the second multimedia component 148 component to a reference communication template 146.

At operation 318, transform manager 140 transforms the source data 112 based on the custom communication template 164.

As described above, transform manager 140 may be configured to transform the received source data 112 using the custom communication template 164. Transforming the source data 112 may include formatting the source data 112 based at least in part upon one or more multimedia components 148 associated with the generated custom communication template 164. Following the above example, transforming the source data 112 may include transforming a first portion of the source data 112 using the selected first multimedia component 148, transforming a second portion of the source data 112 using the second multimedia component 148. In one embodiment, the reference template 146 may include one or more standard multimedia components 148 that are generally used across communication templates 146.

At operation 320, transform manager 140 transmits the transformed communication 122 using the preferred communication channel 162. As described above, after transforming the first and second portions of the source data 112 using the first and second multimedia components 148, transform manager 140 may be configured to transform a remaining portion of the source data 112 using the standard multimedia components 148 of the reference template 146.

Figure 4:
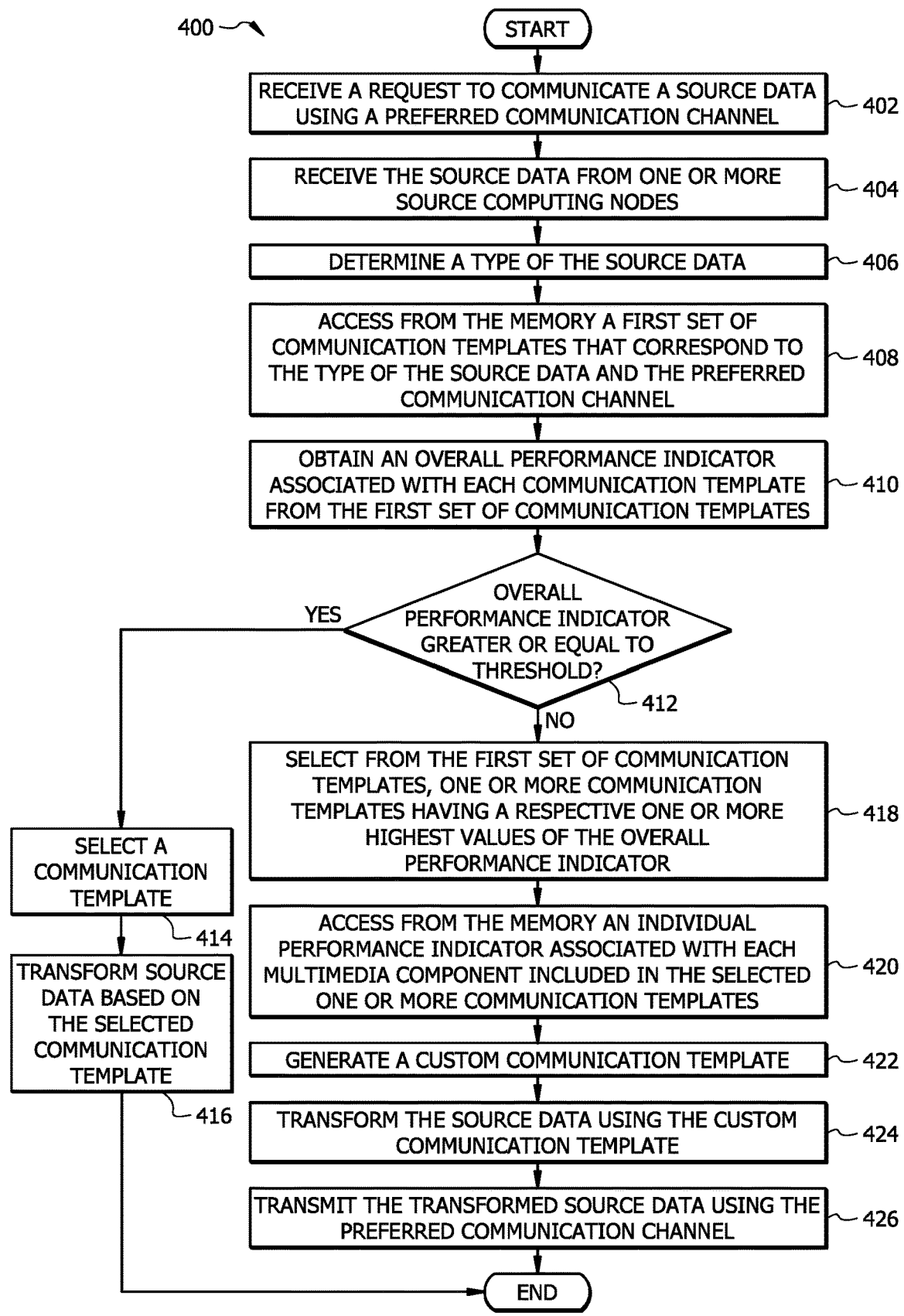
FIG. 4 illustrates a flowchart of an example method for transforming source data according to a communication template, in accordance with one or more embodiments of the present disclosure.

FIG. 4 illustrates a flowchart of an example method 400 for transforming source data 112 according to a communication template 144, in accordance with one or more embodiments of the present disclosure. Method 400 may be performed by the transform manager 140 shown in FIG. 1.

At operation 402, transform manager 140 receives a request to communicate a source data 112 using a preferred communication channel 162.

At operation 404, transform manager 140 receives the source data 112 from one or more source computing nodes 110.

At operation 406, transform manager 140 determines a data type 114 of the source data 112.

As described above, transform manager 140 may be configured to receive a request to communicate a source data 112 using a preferred communication channel 162. Transform manager 140 may receive the source data 112 from one or more source computing nodes 110. Upon receiving the source data 112, transform manager 140 determines a data type 114 associated with the source data 112. For example, transform manager 140 may analyze the data contents in the received source data 112 and determine a data type associated with the source data 112. In one embodiment, the data type 114 associated with the received source data 112 may be included (e.g., as metadata) in the request received from the source computing node 110 transmitting the request. In an additional or alternative embodiment, the request for communication received from the source computing node 110 may include the preferred communication channel 130 that is to be used to transmit a communication 122 generated for the source data 112.

At operation 408, transform manager 140 accesses from the memory (e.g., memory 196 shown in FIG. 1) a first set of communication templates 144 that correspond to the data type 114 of the source data 112 and the preferred communication channel 162.

As described above, transform manager 140 may be configured to store a template archive 142 including a plurality of communication templates 144. Each communication template 144 is designed to transform source data 112 corresponding to one or more data types 114. A communication template 144 may include one or more multimedia components 148 that may be used to transform portions of a source data 112. Multimedia components 148 that may be part of a communication template 144 may include, but are not limited to, one or more of an audio clip, a video clip, a carousel, a spread sheet, a table, a chart and a film strip. In one embodiment, a communication template 144 may include software tools to generate multimedia content corresponding to each multimedia component 148 included in the communication template 144. For example, a particular communication template 144 may include template spreadsheets and other charting tools to present employee data received from an employee database.

Additionally or alternatively, a communication template 144 may be designed for communicating source data 112 using one or more particular communication channels 130. For example, a communication template 144 may be designed to communicate source data 112 on mobile applications such that text and multimedia content generated using the communication template 144 is compatible for presenting using a mobile application on a mobile device such as a smart phone.

Transform manager 140 may be configured to store in the template archive 142 each communication template 144 mapped to one or more of at least one data type 114 the communication template 144 is designed to transform and at least one communication channel 130 the communication template 144 is designed to be used for.

Once the data type 114 associated with the source data 112 and the preferred communication channel 162 is determined (e.g., at operation 206), transform manager 140 may be configured to determine a set of communication templates from the template archive 142 that correspond to the data type 114 associated with the source data 112 and the preferred communication channel 162. In other words, transform manager 140 determines a set of communication templates 144, wherein each communication template 144 from the set is designed to transform source data 112 of a data type 114 that is the same as the determined data type 114 of the received source data 112, and is designed for communication using the preferred communication channel 162 associated with the request. To determine the set of communication templates 144, transform manager 140 may search the communication templates 144 stored in the template archive 142 based on the combination of the data type 114 and preferred communication channel 162 associated with the received request for communication. As described above, each communication channel 130 in the template archive 142 may be mapped to one or more data types 114 and one or more communication channels 130. Transform manager 140 selects those communication templates 144 from the template archive 142 that are mapped to the data type 114 of the received source data 112 and the preferred communication channel 162.

At operation 410, transform manager 140 obtains an overall performance indicator 154 associated with each communication template 144 from the first set of communication templates 144.

As described above, transform manager 140 may be configured to determine at least one of an overall performance indicator 154 and an individual performance indicator 158 for each communication template 144 in the template archive 142. An overall performance indicator 154 associated with a communication template 144 is indicative of an effectiveness of the communication template 144 in communicating source data 112 of one or more data types 114. In an additional or alternative embodiment, an overall performance indicator 154 associated with a communication template 144 is indicative of an effectiveness of the communication template 144 in communicating source data 112 of one or more data types 114 using a particular communication channel 130. An individual performance indicator 158 is associated with a particular multimedia component 148 included in a particular communication template 144. An individual performance indicator 158 associated with a multimedia component 148 included in a communication template 144 is indicative of an effectiveness of the multimedia component in communicating source data 112 of one or more data types 114. In an additional or alternative embodiment, an individual performance indicator 158 associated with a multimedia component 148 included in a communication template 144 is indicative of an effectiveness of the multimedia component in communicating source data 112 of one or more data types 114 using a particular communication channel 130.

Transform manager 140 may be configured to determine an overall performance indicator 154 for a particular communication template 144 based on performance data 150 associated with the particular communication template 144. Performance data 150 associated with a communication template 144 indicates a performance of the communication template 144 in relation to a plurality of usage parameters 152 associated with the communication template 144. In this context, transform manager 140 may be configured to monitor and record (e.g., store) a plurality of usage parameter 152 associated with a communication template 144. Usage parameters 152 associated with a communication template 144 may include, but are not limited to, an average number of times communications 122 generated based on the communication template 144 were accessed by users 106, an average number of times the communications 122 were reviewed by the users 106 from a start to an end of the communications 122, an average number of times multimedia components 148 included in the communications 122 were used/reviewed by the users 106, and an average number of times the communications 122 were accessed using a particular communication channel 130 associated with the communication template 144.

Transform manager 140 may be configured assign a numerical value to the overall performance indicator 154 associated with a communication template 144 based on the performance data 150 associated with the communication template 144. For example, transform manager 140 assigns a higher numerical value to the overall performance indicator 154 associated with the communication template 144 when one or more of the usage parameters 152 are associated with a higher average number.

After determining the set of communication templates 144 that match the data type 114 and preferred communication channel 162 associated with the request, transform manager 140 may be configured to obtain an overall performance indicator 154 associated with each communication template 144 from the determined set of communication templates 144. As described above, an overall performance indicator 154 associated with a communication template 144 is indicative of an effectiveness of the communication template 144 in communicating a source data 112. The transform manager 140 obtains from the template archive 142 the overall performance indicator 154 mapped to each communication template 144 in the determined set of communication templates 144.

At operation 412, transform manager 140 determines whether one or more communication templates 144 in the first set of communication templates 144 are associated with a value of the overall performance indicator 154 that equals or exceeds a first threshold value (e.g., overall threshold 156).

If the transform manager 140 determines that there are one or more communication templates 144 in the first set of communication templates 144 that are associated with a value of the overall performance indicator 154 that equals or exceeds a first threshold value (e.g., overall threshold 156), method 400 proceeds to operation 414, where transform manager 140 one of the communication templates 144 from the first set of communication templates 144 whose overall performance indicator 154 equals or exceeds the overall threshold 156.

At operation 416, transform manager 140 transforms the source data 112 based on the selected communication template 144 as described above.

If the transform manager 140 determines (e.g., operation 412) that no communication template 144 in the first set of communication templates 144 is associated with a value of the overall performance indicator 154 that equals or exceeds a first threshold value (e.g., overall threshold 156), method 400 proceeds to operation 418.

At operation 418, transform manager 140 may select from the determined first set of communication templates 144 one or more communication templates 144 having a respective one or more highest values of the overall performance indicator 154 among the overall performance indicators 154 associated with the communication templates 144 in the determined first set of communication templates 144.

At operation 420, transform manager 140 accesses from the memory (e.g., memory 196 shown in FIG. 1) an individual performance indicator 158 associated with each multimedia component 148 included in the selected one or more communication templates 144.

As described above, after determining one or more communication templates 144 from the template archive 142 that are associated with overall performance indicators 154 equaling or exceeding the overall threshold 156, transform manager 140 may be configured to obtain an individual performance indicator 158 associated with each multimedia component 148 included in the selected one or more communication templates 144. As described above, an individual performance indicator 158 associated with a multimedia component 148 is indicative of an effectiveness of the multimedia component 148 in communicating source data 112.

Transform manager 140 may be configured to determine an individual performance indicator 158 for a particular multimedia component 148 associated with a particular communication template 144 based on performance data 150 associated with the multimedia component 148. Performance data 150 associated with the multimedia component 148 indicates a performance of the multimedia component 148 in relation to one or more usage parameters 152 associated with the multimedia component 148. An example usage parameter 152 associated with a multimedia component 148 associated with a communication template 144 includes an average number of times the multimedia component 148 was used by users 106 in communications 122 generated using the communication template 144.

Transform manager 140 may be configured to assign a numerical value to the individual performance indicator 158 associated with a multimedia component 148 based on the performance data 150 associated with the multimedia component 148. For example, transform manager 140 assigns a higher numerical value to the individual performance indicator 158 associated with the multimedia component 148 when the usage parameter 152 has a higher average number.

At operation 422, transform manager 140 generates a custom communication template 164.

As described above, transform manager 140 may be configured to generate a custom communication template 164 by plugging in highly effective multimedia components 148 from the selected one or more communication templates 144 into a reference template 146. For example, transform manager 140 may analyze the individual performance indicators 158 associated with multimedia components 148 from the selected one or more communication templates 144 and determine those multimedia components 148 that are associated with an individual performance indicator 158 that equals or exceeds an individual threshold 160. In one embodiment, the individual threshold 160 includes a pre-selected numerical value of the individual performance indicator 158. To generate a custom communication template 164, transform manager 140 may be configured to add to a reference template 146 one or more of the determined multimedia components 148 associated with an individual performance indicator 158 that equals or exceeds an individual threshold 160. In one embodiment, the reference template 146 may be a communication template 144 from the determined set of communication templates 144 that is associated with the highest numerical value of the overall performance indicator 154 among the overall performance indicators 154 associated with the communication templates 144 in the set. In an alternative embodiment, the reference template 146 is a blank communication template in which multimedia components 148 may be added as needed to generate a custom communication template 164.

In one example, transform manager 140 determines from the set of communication templates 144, a first communication template 144 and a second communication template 144, wherein the respective overall performance indicators 154 of the first and second communication templates 144 equal or exceed the overall threshold 156. Transform manager 140 determines from the first communication template 144, a first multimedia component 148 having an associated first individual performance indicator 158 that equals or exceeds the individual threshold 160. Transform manager 140 determines from the second communication template 144, a second multimedia component 148 having an associated second individual performance indicator 158 that equals or exceeds the individual threshold 160. Transform manager 140 generates a custom communication template 164 by adding the first multimedia component 148 and the second multimedia component 148 component to a reference communication template 146.

At operation 424, transform manager 140 transforms the source data 112 based on the custom communication template 164.

As described above, transform manager 140 may be configured to transform the received source data 112 using the custom communication template 164. Transforming the source data 112 may include formatting the source data 112 based at least in part upon one or more multimedia components 148 associated with the generated custom communication template 164. Following the above example, transforming the source data 112 may include transforming a first portion of the source data 112 using the selected first multimedia component 148, transforming a second portion of the source data 112 using the second multimedia component 148. In one embodiment, the reference template 146 may include one or more standard multimedia components 148 that are generally used across communication templates 146.

At operation 426, transform manager 140 transmits the transformed communication 122 using the preferred communication channel 162. As described above, after transforming the first and second portions of the source data 112 using the first and second multimedia components 148, transform manager 140 may be configured to transform a remaining portion of the source data 112 using the standard multimedia components 148 of the reference template 146.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory that stores a plurality of communication templates, wherein each communication template comprises one or more multimedia components and is associated with a performance indicator;
   a processor communicatively coupled to the memory, wherein the processor is configured to:
      receive a request to communicate a source data using a preferred communication channel;
      receive the source data from one or more source computing nodes;
      determine a type of the source data;
      access from the memory a first set of communication templates that correspond to the type of the source data and the preferred communication channel;
      obtain a performance indicator associated with each communication template from the first set of communication templates, wherein the performance indicator associated with each communication template is indicative of an effectiveness of the communication template in communicating the type of the source data;
      select from the first set of communication templates, a first communication template associated with the highest value of the performance indicator;
      transform the source data using the selected first communication template by formatting the source data based at least in part upon one or more multimedia components associated with the selected first communication template; and
      transmit the transformed source data using the preferred communication channel.

2. The system of claim 1, wherein the processor is further configured to:
   receive performance data associated with the first communication template, wherein the performance data indicates a performance of the first communication template in relation to a plurality of usage parameters associated with the first communication template; and assign a numerical value to the performance indicator associated with the first communication template based on the performance data associated with the first communication template.

3. The system of claim 2, wherein the usage parameters comprise one or more of:
an average number of times communications generated based on the first communication template were accessed by users;
an average number of times the communications were reviewed by the users from a start to an end of the communications;
an average number of times multimedia components included in the communications were used by the users; and
an average number of times the communications were accessed using a particular communication channel associated with the first communication template.

4. The system of claim 3, wherein the processor is configured to:
assign a higher numerical value to the performance indicator associated with the first communication template when one or more of the usage parameters are associated with a higher average number.

5. The non-transitory computer-readable medium of claim 3, wherein the instructions further cause the processor to:
assign a higher numerical value to the performance indicator associated with the first communication template when one or more of the usage parameters are associated with a higher average number.

6. The system of claim 1, wherein:
each communication template is associated with one or more types of source data such that the communication template is configured to be used to transform the one or more types of source data; and
each communication template is associated with one or more communication channels such that the communication template is configured to be used for communications using the one or more communication channels.

7. The system of claim 1, wherein the processor is further configured to receive the source data from a plurality of the source computing nodes.

8. The system of claim 1, wherein the multimedia components comprise one or more of an audio clip, a video clip, a carousel, and a film strip.

9. The system of claim 1, wherein the preferred communication channel comprises one or more of a website, a mobile application, email, and a virtual reality platform.

10. A method for transforming data, comprising:
receiving a request to communicate a source data using a preferred communication channel; receive the source data from one or more source computing nodes;
determining a type of the source data;
accessing from a memory a first set of communication templates that correspond to the type of the source data and the preferred communication channel, wherein the first set of communication templates is part of a plurality of communication templates stored in the memory, wherein each communication template comprises one or more multimedia components and is associated with a performance indicator;
obtaining a performance indicator associated with each communication template from the first set of communication templates, wherein the performance indicator associated with each communication template is indicative of an effectiveness of the communication template in communicating the type of the source data;
selecting from the first set of communication templates, a first communication template associated with the highest value of the performance indicator;
transforming the source data using the selected first communication template by formatting the source data based at least in part upon one or more multimedia components associated with the selected first communication template; and
transmitting the transformed source data using the preferred communication channel.

11. The method of claim 10, further comprising:
receiving performance data associated with the first communication template, wherein the performance data indicates a performance of the first communication template in relation to a plurality of usage parameters associated with the first communication template; and
assigning a numerical value to the performance indicator associated with the first communication template based on the performance data associated with the first communication template.

12. The method of claim 11, wherein the usage parameters comprise one or more of:
an average number of times communications generated based on the first communication template were accessed by users;
an average number of times the communications were reviewed by the users from a start to an end of the communications;
an average number of times multimedia components included in the communications were used by the users; and
an average number of times the communications were accessed using a particular communication channel associated with the first communication template.

13. The method of claim 12, further comprising:
assigning a higher numerical value to the performance indicator associated with the first communication template when one or more of the usage parameters are associated with a higher average number.

14. The method of claim 10, wherein:
each communication template is associated with one or more types of source data such that the communication template is configured to be used to transform the one or more types of source data; and
each communication template is associated with one or more communication channels such that the communication template is configured to be used for communications using the one or more communication channels.

15. The method of claim 10, further comprising receiving the source data from a plurality of the source computing nodes.

16. The method of claim 10, wherein the multimedia components comprise one or more of an audio clip, a video clip, a carousel, and a film strip.

17. The method of claim 10, wherein the preferred communication channel comprises one or more of a website, a mobile application, email, and a virtual reality platform.

18. A non-transitory computer-readable medium for transforming data, wherein the computer-readable medium stores instructions which when executed by a processor cause the processor to:

receive a request to communicate a source data using a preferred communication channel; receive the source data from one or more source computing nodes;

determine a type of the source data;

access from a memory a first set of communication templates that correspond to the type of the source data and the preferred communication channel, wherein the first set of communication templates is part of a plurality of communication templates stored in the memory, wherein each communication template comprises one or more multimedia components and is associated with a performance indicator;

obtain a performance indicator associated with each communication template from the first set of communication templates, wherein the performance indicator associated with each communication template is indicative of an effectiveness of the communication template in communicating the type of the source data;

select from the first set of communication templates, a first communication template associated with the highest value of the performance indicator;

transform the source data using the selected first communication template by formatting the source data based at least in part upon one or more multimedia components associated with the selected first communication template; and transmit the transformed source data using the preferred communication channel.

19. The non-transitory computer-readable medium of claim 18, wherein the instructions further cause the processor to:

receive performance data associated with the first communication template, wherein the performance data indicates a performance of the first communication template in relation to a plurality of usage parameters associated with the first communication template; and assign a numerical value to the performance indicator associated with the first communication template based on the performance data associated with the first communication template.

20. The non-transitory computer-readable medium of claim 19, wherein the usage parameters comprise one or more of:

an average number of times communications generated based on the first communication template were accessed by users;

an average number of times the communications were reviewed by the users from a start to an end of the communications;

an average number of times multimedia components included in the communications were used by the users; and an average number of times the communications were accessed using a particular communication channel associated with the first communication template.

\* \* \* \* \*